United States Patent
Moisel

(10) Patent No.: US 10,285,234 B2
(45) Date of Patent: May 7, 2019

(54) METHOD FOR THE OPERATION OF A LIGHT UNIT, AND LIGHT UNIT

(71) Applicant: DAIMLER AG, Stuttgart (DE)

(72) Inventor: Joerg Moisel, Neu-Ulm (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 15/766,858

(22) PCT Filed: Aug. 28, 2016

(86) PCT No.: PCT/EP2016/001452
§ 371 (c)(1),
(2) Date: Apr. 9, 2018

(87) PCT Pub. No.: WO2017/059940
PCT Pub. Date: Apr. 13, 2017

(65) Prior Publication Data
US 2018/0310375 A1    Oct. 25, 2018

(30) Foreign Application Priority Data

Oct. 10, 2015 (DE) .................. 10 2015 013 191

(51) Int. Cl.
H05B 37/00 (2006.01)
H05B 39/00 (2006.01)
H05B 33/08 (2006.01)
(Continued)

(52) U.S. Cl.
CPC ............ *H05B 33/0845* (2013.01); *B60Q 1/14* (2013.01); *F21S 41/141* (2018.01); *F21S 41/663* (2018.01); *G06T 1/20* (2013.01); *B60Q 2300/122* (2013.01)

(58) Field of Classification Search
CPC .... B60Q 3/0293; B60Q 11/005; B60Q 1/387; B60Q 1/2603; B60Q 3/048; B60Q 1/1415;
(Continued)

(56) References Cited

U.S. PATENT DOCUMENTS 6,961,064 B2   11/2005   Bushey
9,243,773 B2   1/2016    Funk et al.
(Continued)

FOREIGN PATENT DOCUMENTS

DE            10223751 A1    1/2003
DE        102008062640 A1    7/2009
(Continued)

OTHER PUBLICATIONS

International Search Report dated Dec. 13, 2016 in related International Application No. PCT/EP2016/001452.
(Continued)

*Primary Examiner* — Minh D A
(74) *Attorney, Agent, or Firm* — Patent Portfolio Builders PLLC

(57) ABSTRACT

A method for the operation of a vehicle light unit is provided. The light unit includes at least one light source module having several light sources and a control unit coupled to the light source module. The light sources each include a predetermined number of brightness levels. A predetermined number of light sources are combined by the control unit to form at least one controllable light source unit. In order to set a light distribution, the light sources that form the at least one light source unit are activated together and a brightness level of each light source of the at least one activated light source unit is set individually.

17 Claims, 3 Drawing Sheets

Figure 1:
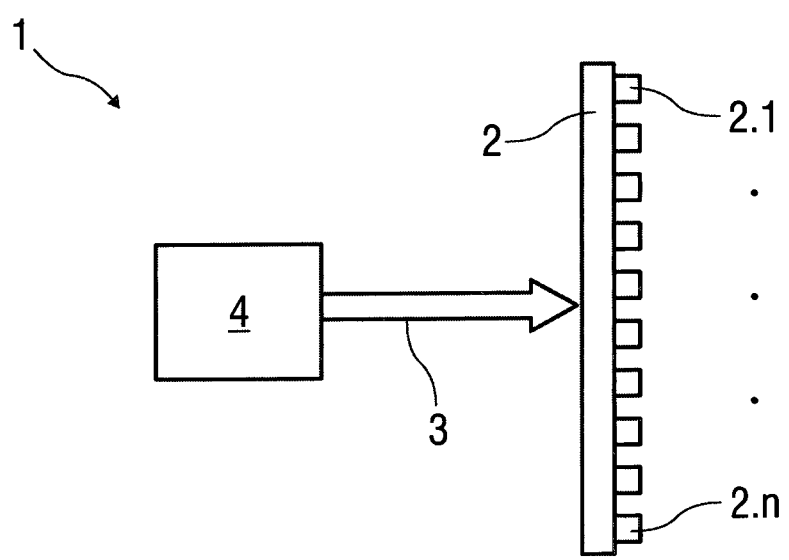

(51) Int. Cl.
  *F21S 41/141* (2018.01)
  *F21S 41/663* (2018.01)
  *B60Q 1/14* (2006.01)
  *G06T 1/20* (2006.01)

(58) Field of Classification Search
  CPC . B60Q 1/143; B60Q 1/44; B60Q 1/54; B60Q 2300/112; B60Q 1/1423; B60Q 9/001; B60Q 1/122; B60Q 2300/122; B60Q 1/124; B60Q 1/18; B60R 16/03; H02K 21/48; B62J 6/001; B62J 6/003; H02J 7/1492
  See application file for complete search history.

(56) References Cited

U.S. PATENT DOCUMENTS

| | | | |
|---|---|---|---|
| 2005/0111231 A1* | 5/2005 | Crodian | B60Q 1/1423 362/545 |
| 2005/0219851 A1* | 10/2005 | Takeda | B60Q 1/2603 362/464 |
| 2010/0296285 A1* | 11/2010 | Chemel | F21S 2/005 362/235 |
| 2014/0340214 A1* | 11/2014 | McLoughlin | B60Q 1/2611 340/472 |
| 2015/0220768 A1 | 8/2015 | Ronnecke et al. | |

FOREIGN PATENT DOCUMENTS

| | | |
|---|---|---|
| DE | 102008062639 A1 | 6/2010 |
| DE | 102011108384 A1 | 1/2013 |
| DE | 102013016904 A1 | 7/2014 |

OTHER PUBLICATIONS

Written Opinion dated Dec. 13, 2016 in related International Application No. PCT/EP2016/001452.

* cited by examiner

METHOD FOR THE OPERATION OF A LIGHT UNIT, AND LIGHT UNIT

BACKGROUND AND SUMMARY OF THE INVENTION

Exemplary embodiments of the invention relate to a method for the operation of a light unit for a vehicle and to a light unit.

In general, light units for vehicles are known from prior art, in particular vehicle headlights having a light source module, in which the light sources of the light source module can be controlled individually by means of a control unit coupled to the light source module. Vehicle headlights formed in such a way are also known as pixel headlights or matrix headlights.

German patent document DE 102 23 751 B4 discloses a method for combining graphic formats in a digital video pipeline. In the method, a pipeline connection matrix is selectively configured in order to establish an image path by means of one or more steps of a graphic pipeline and one or more steps of a bit table image pipeline and in order to deliver selected output data from one or more of the steps of one of the pipelines to selected inputs of one or more of the steps of the other of the pipelines. Here, an output step can be connected to an output from each of the pipelines (e.g., from a selected step both of the graphic and the bit table image pipeline). The connection between the pipelines can comprise a switching matrix that can be configured to lead outputs from one or more of the first plurality of (graphic) steps to a certain or selected next one of the first plurality of (graphic) steps and to a selected one of the second plurality of (bit table image) steps. German patent document DE 10 2011 108 384 A1 discloses a headlight for a vehicle having a plurality of lighting means in which the lighting means are arranged in a matrix having a first extension direction and a second extension direction perpendicular thereto. Here, the lighting means are controlled individually.

German patent document DE 10 2008 062 640 A1 discloses a vehicle headlight having a plurality of LED light sources that are combined in a common light source matrix emitting light. The individual LED light sources can be designed to be able to be switched on and/or switched off and/or dimmed in order to change a light distribution of the light source matrix emitting light. At least one light distribution is stored in a storage unit as a brightness value for each individual LED light source. An evaluating and control unit selects a stored light distribution depending on at least one received parameter and correspondingly controls the LED light sources of the light source matrix.

Exemplary embodiments of the invention is directed to an improved method for the operation of a light unit in comparison to the prior art, as well as an improved light unit, in which flicker effects are avoided or at least reduced.

In a method for the operation of a vehicle light unit, according to an embodiment, wherein the light unit comprises at least one light source module having several light sources and a control unit coupled to the light source module, and the light sources each comprise a predetermined number of brightness levels, a predetermined number of light sources is activated for setting a light distribution by the control unit, and a brightness level of each light source is set individually.

According to the embodiments of the invention, a predetermined number of light sources is combined by the control unit to form at least one controllable light source unit. In order to set a light distribution, the light sources that form the at least one light source unit are activated together, whereas the brightness level of each of the light sources of the activated light source unit is set individually.

The combination of several light sources to form a controllable light source unit allows a higher resolution of the brightness level in the light distribution because a number of brightness levels in the light source unit in comparison to a number of brightness levels of an individual light source is increased by the factor that comprises the number of light sources that form a light source unit. In other words, if "x" light sources are combined to form a light source unit, the number of brightness levels of the light source unit increases by "x" in comparison to the number of brightness levels of an individual light source. Thus, above all, flicker effects in a lower brightness region can be avoided or at least reduced.

Embodiments of the method are particularly advantageous, in particular, in vehicle headlights having a high number of light sources, for example so-called pixel headlights having light diode arrays because above a certain number of light sources the human eye can no longer individually distinguish these and thus a reduced local resolution caused by the combination of several light sources cannot be optically perceived.

According to embodiments, the at least one light source unit is formed from a number of light sources arranged adjacently to one another, such that a common beam point, which is optically perceived as a light source, is formed from several light sources for generating a light distribution. Preferably, here, several light source units are formed, such that the increased brightness resolution occurs as homogeneously as possible in the light distribution.

The light sources forming the at least one light source unit can here be arranged horizontally, vertically, or diagonally adjacent to one another. For example, rectangular or square adjacent regions of light sources can be combined to form a light source unit.

The control of which of the light sources are to combine to form a light source unit takes place using the control unit that transmits a corresponding piece of information from the control unit to the light source module and this then activates the combined light sources together. The piece of information can, for example, be transmitted by a control signal for generating a light distribution.

To individually set the brightness level of a controlled light source, the brightness level to be set is also transmitted from the control unit to the light source module.

Setting the light distribution and the brightness preferably takes place automatically, depending on a current driving situation of the vehicle, which can be determined, for example, from the state variables of the vehicle. The state variables are vehicle data, such as a steering angle, a speed, a yaw angle, longitudinal and transverse acceleration, as well as switch positions, and surrounding data, brightness values detected by means of a camera and/or other sensors, moveable and immoveable objects etc., for example.

The control unit and the light source module are coupled together via a data bus, e.g., a CAN-bus, to control the light source module by means of the control unit.

The light unit according to the invention comprises at least one light source module and one control unit coupled to the light source module, wherein the light source module comprises several light sources that each have a predetermined number of brightness levels, and wherein the control unit for setting a light distribution is formed in such a way that it combines a predetermined number of light sources to form at least one controllable light source unit and activates the light sources forming the at least one light source unit together and individually sets a brightness level of each of the light sources of the at least one activated light source unit.

The advantages obtained by embodiments of the invention include better resolution of the brightness as a result of reducing the local resolution by means of combining and setting the individual brightness of several light sources, which are combined to form a light source module.

BRIEF DESCRIPTION OF THE DRAWING FIGURES

Exemplary embodiments of the invention are illustrated in greater detail below by means of drawings.

Figure 2:
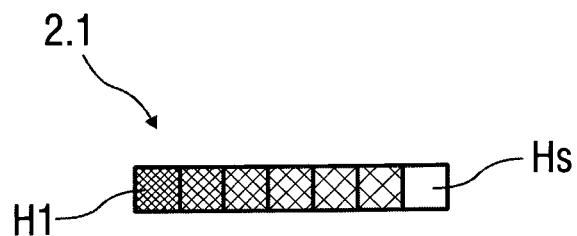

Here are shown:

FIG. 1 schematically, a block diagram of an exemplary embodiment of a light unit for a vehicle, FIG. 2 schematically, a qualitative depiction of a light source having seven brightness levels.

Figure 3:
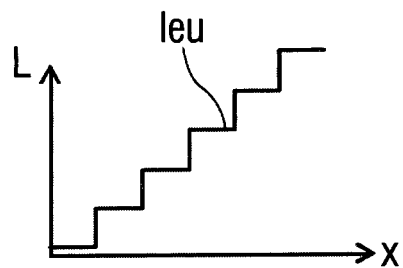
Figure 4:
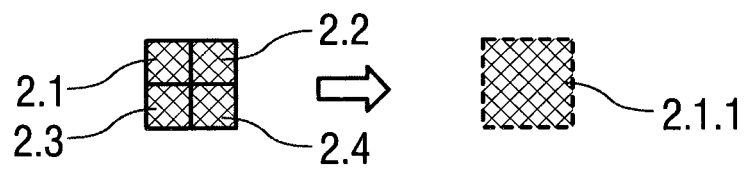
Figure 5:
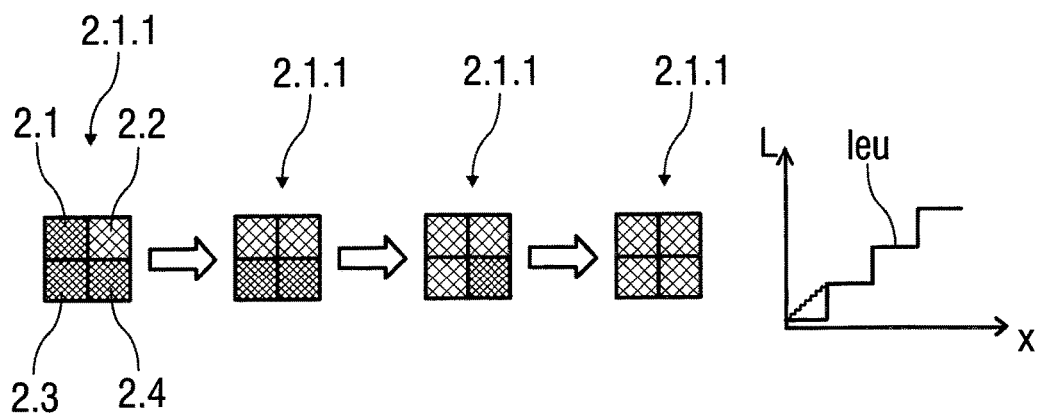
Figure 5:
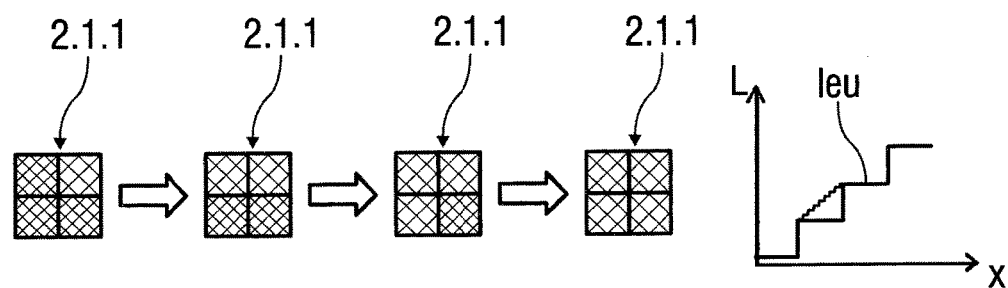
Figure 5:
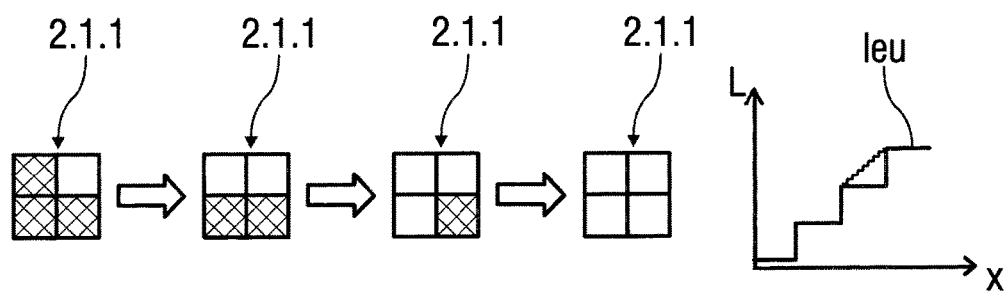

FIG. 3 schematically, a luminance measurement belonging to the brightness level shown according to FIG. 2, FIG. 4 schematically, four light sources that are arranged in a square adjacent region and are combined by means of a method according to the invention for the operation of a light unit to form a light source unit and FIG. 5 schematically, an exemplary course of a variable setting of the brightness levels of the individual light sources within a light source unit having an allocated luminance function.

Parts that correspond to one another are provided with the same reference numerals in all figures.

DETAILED DESCRIPTION

In FIG. 1, a block diagram of a possible exemplary embodiment of a light unit 1 for a vehicle (not illustrated) is depicted, wherein the light unit 1, in particular, is a headlight of the vehicle, for example, a so-called pixel headlight.

The light unit 1 here comprises a light source module 2 having several light sources 2.1 to 2.n and a control unit 4 connected to the light source module 2 via a data bus 3.

The light sources 2.1 to 2.n are arranged on a side facing away from the control unit 4 and are distributed, for example, like a matrix across the light source module 2. The light sources 2.1 to 2.n are each formed, for example, as a light emitting diode. Alternatively, a light source 2 can also comprise several light elements.

The control unit 4 coupled to the light source module 2 is coupled in order to set a light distribution to be generated by the light sources 2.1 to 2.n. To do so, the light sources 2.1 to 2.n can be controlled individually by the control unit 4, wherein operating parameters, in particular a brightness, of each light source 2.1 to 2.n can be set variably. Here, a certain number of brightness levels H1 to Hs, e.g. s=256, can be set for each light source 2.1 to 2.n. An exemplary embodiment of a light source 2.1 having seven brightness levels H1 to Hs, here s=7, is shown in FIG. 2.

Setting the light distribution and the operating parameters takes place, in particular, automatically, depending on a current driving situation of the vehicle, which is determined from state variables by means of the control unit 4. The state variables are vehicle data, such as a steering angle, a speed, a yaw angle, longitudinal and transverse acceleration, and switch positions, and surroundings data such as, for example, brightness values detected by means of a camera and/or other sensors, moveable and immoveable objects.

Up to a certain number of light sources 2.1 to 2.n, for example up to n=100, there is the possibility to transfer the brightness level H1 to Hs of the individual light sources 2.1 to 2.n that are to be set to each light distribution to be generated from the control unit 4 to the light source module 2 via the data bus 3, which is a CAN-bus, for example.

With a greater number of light sources 2.1 to 2.n, for example n>1000, a simple data bus 3 is no longer sufficient to transfer the corresponding brightness level H1 to Hs for each light source 2.1 to 2.n in the shortest possible time because of the growing amount of data to be transferred and data rate. To solve this, high speed data transfer lines, for example, can be used, or a data reduction takes place by means of low-loss data compression algorithms.

FIG. 2 schematically shows a qualitative depiction of a light source 2.1 having seven settable brightness levels H1 to Hs, wherein a minimally set brightness level H1 results in a minimum brightness and a maximally set brightness level Hs, here s=7, results in a maximum brightness of the light source 2.1.

FIG. 3 shows a luminance function leu belonging to the brightness levels H1 to H7 shown in FIG. 2, wherein a luminance L increases in levels and each level corresponds to a brightness level H1 to H7.

As described above, a predetermined number of brightness levels H1 to Hs can be set for each light source 2.1 to 2.n, the predetermined number being limited to a maximum predeterminable number of brightness levels for technical reasons, e.g., s=1024. This limitation can lead to unwanted flicker effects in the light distribution which is generated, in particular in low brightness regions.

In order to increase a brightness resolution, embodiments of the invention provide a method in which a certain number of the light sources 2.1 to 2.n are combined to form at least one light source unit 2.1.1.

To do so, by way of example, FIG. 4 shows four schematised light sources 2.1 to 2.4 arranged in a square adjacent region and combined by the method to form a light source unit 2.1.1 as a logical pixel. Here, in the alternative, rectangular adjacent regions, vertically, horizontally and/or diagonally contiguous light sources 2.1 to 2.n can also be combined to form a light source unit 2.1.1.

The combination of several light sources 2.1 to 2.n to form a light source unit 2.1.1 here means the joint control of all the light sources 2.1 to 2.n forming the light source unit 2.1.1, such that these can no longer be activated individually by the control unit 4 but are activated together to generate a light distribution.

This is possible, in particular, without the loss of optical quality of the light distribution when the number of light sources 2.1 to 2.n is very high, e.g., n>1000. Because of the limited resolution capability of the human eye, here, individual light sources 2.1 to 2.n can no longer be made out, such that the combination of several light sources 2.1 to 2.n to form a light source unit 2.1.1 is not optically perceptible as such. It is thus possible to combine, for example, 4, 9, 16 or a non-quadratic number of light sources 2.1 to 2.n to form a light source unit 2.1.1. Preferably, a plurality of light source units 2.1.1 is formed by the method in the manner described above, such that as homogeneous an increase in a brightness resolution as possible is possible.

The brightness levels of the individual light sources 2.1 to 2.n that form a light source unit 2.1.1 can be further controlled individually by the control unit 4 in order to increase the brightness resolution.

To do so, FIG. 5 shows an exemplary course of a variable setting of the brightness levels H1 to Hs of the individual light sources 2.1 to 2.4 within the light source unit 2.1.1, wherein the course is shown in three rows and a luminance function leu is depicted for each row.

In the course shown, a brightness of the light source unit 2.1.1 based on a minimum total brightness up to a maximum total brightness is depicted, wherein the number of brightness levels H1 to Hs for each light source 2.1 to 2.4 is set to s=4 for the purpose of better illustration.

The brightness levels H1 to H4 of the individual light sources 2.1 to 2.4 are increased in steps. In the present exemplary embodiment, here the brightness level H1 to H4 of an individual light source 2.1 to 2.4 is increased in each step shown by one brightness level H1 to H4 in each case, until the maximum brightness level H4 is set for all light sources 2.1 to 2.4 and thus a maximum total brightness of the light source unit 2.1.1 is achieved, as the final step shows.

Thus, the total brightness of the light source unit 2.1.1 can be changed by the method in smaller steps than is possible with individual light sources 2.1 to 2.$n$. Here, it applies that the number of brightness levels H1 to Hs increases by the factor that comprises the number of light sources 2.1 to 2.$n$, which form the light source unit 2.1.1. For example, for each light source 2.1 to 2.$n$, 256 brightness levels H1 to Hs can be set, wherein s=256. If, then, four light sources 2.1 to 2.4 are combined to form a light source unit 2.1.1, 1024 brightness levels H1 to Hs can be set for the light source unit 2.1.1, wherein s=1024.

The resulting increase of the brightness resolution improves an optical quality of the light distribution generated by means of the light sources 2.1 to 2.$n$, in that notably unwanted flicker effects, in particular in low brightness regions, are avoided or at least reduced.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for the operation of a vehicle light unit, the method comprising:
   determining a light distribution for the vehicle light unit; and
   forming at least one controllable light source unit based on the determined light distribution for the vehicle light unit,
   wherein the vehicle light unit comprises at least one light source module having a plurality of light sources and a control unit coupled to the light source module,
   wherein the plurality of light sources each comprise a predetermined number of brightness levels,
   wherein a predetermined number of the plurality of light sources is combined by the control unit to form the at least one controllable light source unit,
   wherein the plurality of light sources forming the at least one controllable light source unit are activated together to set a light distribution,
   wherein a brightness level of each of the plurality of light sources of the at least one controllable light source unit is set individually and independently of other ones of the plurality of light sources so that at least one of the plurality of light sources of the at least one controllable light source unit has a different brightness level than other ones of the plurality of light sources, and
   wherein a brightness resolution of the at least one controllable light source unit is set by an amount of light sources forming the at least one controllable light source unit, the method further comprising
   determining a current driving situation of the vehicle based on vehicle data; and
   automatically setting the light distribution and the brightness levels of the plurality of light sources depending on the current driving situation of the vehicle.

2. The method of claim 1, wherein the at least one controllable light source unit is formed from a number of the plurality of light sources arranged adjacent to one another.

3. The method of claim 2, wherein the plurality of light sources arranged adjacent to one another are arranged horizontally, vertically or diagonally adjacently to one another.

4. The method of claim 1, further comprising:
   transmitting information from the control unit to the light source module to form the at least one controllable light source unit, the light source module comprising the plurality of light sources to be combined.

5. The method of claim 4, further comprising:
   transferring the brightness level to be set and the information about the plurality of light sources to be combined via a data bus.

6. The method of claim 1, further comprising:
   transmitting the brightness level to be set from the control unit to the light source module to individually set a brightness level of each of the plurality of light sources.

7. The method of claim 1, wherein the vehicle data includes at least one of steering angle, speed, yaw angle, longitudinal and transverse acceleration, switch positions, and surroundings data.

8. The method of claim 1, wherein the control unit is operable to control the at least one controllable light source to have a number of brightness levels equal to a product of the predetermined number of brightness levels of the plurality of light sources and a total number of the plurality of light sources.

9. The method of claim 1, wherein the control unit transfer a brightness level for each of the plurality of light sources to the at least one light source module.

10. The method of claim 1, wherein the plurality of light sources form a pixel headlight.

11. A vehicle light unit, comprising:
    at least one light source module comprising a plurality of light sources that each have a predetermined number of brightness levels; and
    a controller coupled to the light source module, wherein the controller is configured to
    set a light distribution of a combination of the plurality of light sources to form at least one controllable light source unit,
    activate the plurality of light sources forming the at least one controllable light source unit together, and individually set a brightness level of each of the plurality of light sources of the at least one controllable light source unit, wherein the brightness level of each of the plurality of light sources is set independently of other ones of the plurality of light sources so that at least one of the plurality of light sources of the at least one controllable light source unit has a different brightness level than other ones of the plurality of light sources,
wherein a brightness resolution of the at least one controllable light source unit is set by an amount of light sources forming the at least one controllable light source unit, and
wherein the controller is further configured to automatically set the light distribution and brightness levels of the plurality of light sources depending on a current driving situation of the vehicle, wherein the current driving situation of the vehicle is based on vehicle data.

12. The vehicle light unit of claim 11, wherein the plurality of light sources are arranged horizontally, vertically, or diagonally adjacent to one another.

13. The vehicle light unit of claim 11, wherein the control unit is configured to transmit information to the light source module regarding the plurality of light sources to be combined.

14. The vehicle light unit of claim 11, wherein the vehicle data includes at least one of steering angle, speed, yaw angle, longitudinal and transverse acceleration, switch positions, and surroundings data.

15. The vehicle light unit of claim 11, wherein the control unit is operable to control the at least one controllable light source to have a number of brightness levels equal to a product of the predetermined number of brightness levels of the plurality of light sources and a total number of the plurality of light sources.

16. The vehicle light unit of claim 11, wherein the control unit transfer a brightness level for each of the plurality of light sources to the at least one light source module.

17. The vehicle light unit of claim 11, wherein the plurality of light sources form a pixel headlight.

* * * * *